US010436159B2

(12) United States Patent
Hartmann (10) Patent No.: US 10,436,159 B2
(45) Date of Patent: Oct. 8, 2019

(54) VEHICLE SILENCER (71) Applicant: Henn GmbH & Co KG., Dornbirn (AT)

(72) Inventor: Harald Hartmann, Dornbirn (AT)

(73) Assignee: Henn GmbH & Co KG., Dornbirn (AT)

(*) Notice: Subject to any disclaimer, the term of this patent is extended or adjusted under 35 U.S.C. 154(b) by 61 days.

(21) Appl. No.: 15/576,895

(22) PCT Filed: May 25, 2016

(86) PCT No.: PCT/AT2016/050165
§ 371 (c)(1),
(2) Date: Nov. 27, 2017

(87) PCT Pub. No.: WO2016/191780
PCT Pub. Date: Dec. 8, 2016

(65) Prior Publication Data
US 2018/0149122 A1    May 31, 2018

(30) Foreign Application Priority Data
May 29, 2015   (AT) .............................. A 50437/2015

(51) Int. Cl.
F02M 35/12        (2006.01)
F04D 25/02        (2006.01)
(Continued)

(52) U.S. Cl.
CPC .. *F02M 35/1266* (2013.01); *F02M 35/10157* (2013.01); *F02M 35/12* (2013.01);
(Continued)

(58) Field of Classification Search
CPC ........... F02M 35/1266; F02M 35/1283; F02M 35/10157; F02M 35/1255; F02M 35/12;
(Continued)

(56) References Cited

U.S. PATENT DOCUMENTS 4,422,525 A * 12/1983 Seeger ...................... F01N 1/06
                                                       181/255
4,874,062 A * 10/1989 Yanagida .................. F01N 1/02
                                                       181/250
(Continued)

FOREIGN PATENT DOCUMENTS

AT            13947     *    1/2015
AT            13947 U1       1/2015
(Continued)

OTHER PUBLICATIONS

International Search Report of PCT/AT2016/050165, dated Oct. 6, 2016.

*Primary Examiner* — Hoang M Nguyen
(74) *Attorney, Agent, or Firm* — Collard & Roe, P.C.

(57) ABSTRACT

The invention relates to a vehicle silencer (1) for a charge air line of an internal combustion engine having a turbocharger (7), comprising: at least a first housing part (2) and a second housing part (3), wherein the housing parts (2, 3) are coupled to each other in a connection region (4) and form an outer casing (13) of the vehicle silencer (1); a resonator inner element (14), which is retained in at least one of the housing parts (2, 3), wherein at least a first (10) and a second resonator chamber (11) are formed by the two housing parts (2, 3) and the resonator inner element (14). The resonator inner element (14) has at least a first external retaining segment (50) in the region of an outer periphery (44) of the resonator inner element (14). A retaining groove (30) is formed in the first end wall (16) and/or in the second end wall (28), in which retaining grove the retaining segment (50) is accommodated.

13 Claims, 6 Drawing Sheets (51) Int. Cl.
*F04D 29/66* (2006.01)
*F16L 55/052* (2006.01)
*F16L 55/033* (2006.01)
*F02M 35/10* (2006.01)

(52) U.S. Cl.
CPC .... *F02M 35/1255* (2013.01); *F02M 35/1283* (2013.01); *F04D 25/024* (2013.01); *F04D 29/665* (2013.01); *F16L 55/0331* (2013.01); *F16L 55/052* (2013.01); *Y02T 10/144* (2013.01)

(58) Field of Classification Search
CPC .... F04D 25/024; F04D 29/665; F16L 55/052; F16L 55/0331; Y02T 10/144
USPC .......................................... 60/605.2; 181/227
See application file for complete search history.

(56) References Cited

U.S. PATENT DOCUMENTS

| | | | |
|---|---|---|---|
| 5,762,858 A | 6/1998 | Maeda et al. | |
| 8,177,024 B2* | 5/2012 | Caliskan | F02M 35/10321 123/184.53 |
| 8,485,311 B2 | 7/2013 | MacKenzie et al. | |
| 9,890,752 B2 | 2/2018 | Hartmann et al. | |
| 2014/0196977 A1* | 7/2014 | Hartmann | F02M 35/1283 181/227 |
| 2014/0196978 A1* | 7/2014 | Hartmann | F02M 35/1036 181/229 |

FOREIGN PATENT DOCUMENTS

| | | |
|---|---|---|
| AT | 514 568 A4 | 2/2015 |
| CA | 2 280 917 A1 | 8/1998 |
| CN | 102 654 089 A | 9/2012 |
| CN | 203 374 348 U | 1/2014 |
| CN | 203 430 857 U | 2/2014 |
| DE | 199 57 597 A1 | 5/2001 |
| DE | 10 2005 005 865 A1 | 8/2006 |
| DE | 20 2006 012 636 U1 | 12/2007 |
| EP | 2 295 782 A1 | 3/2011 |
| JP | S59-141707 A | 8/1984 |
| WO | 98/35156 A1 | 8/1998 |

* cited by examiner

VEHICLE SILENCER

CROSS REFERENCE TO RELATED APPLICATIONS

This application is the National Stage of PCT/AT2016/050165 filed on May 25, 2016, which claims priority under 35 U.S.C. § 119 of Austrian Application No. A 50437/2015 filed on May 29, 2015, the disclosure of which is incorporated by reference. The international application under PCT article 21(2) was not published in English.

The invention relates to a vehicle silencer for a charge air line of an internal combustion engine with a turbocharger.

DE10 2005 005 865 A1 discloses a vehicle silencer with an inner resonator element, which together with the outer casing of the vehicle silencer forms two resonator chambers.

The underlying objective of the present invention is to provide an improved vehicle silencer, which despite having the simplest possible structure has a high degree of functionality and effectiveness.

Said objective of the invention is achieved by the vehicle silencer described in this document.

According to the invention a vehicle silencer is designed for a charge air line of an internal combustion engine with a turbocharger. The vehicle silencer comprises:
at least one first housing part with an first outer casing, which comprises a first end wall, and a second housing part with a second outer casing, which comprises a second end wall, wherein the housing parts are coupled together in a connecting area and form an outer casing of the vehicle silencer;
an inner resonator element, which is mounted in at least one of the housing parts, and at least one chamber dividing wall, and adjoining an inner periphery of the chamber dividing wall, comprises at least one first inner pipe section, wherein by means of the two housing parts and the inner resonator element at least one first and one second resonator chamber are formed.

The inner resonator element comprises in the region of an outer periphery of the inner resonator element at least one first outer retaining segment. In the first end wall and/or in the second end wall a retaining groove is formed in which the retaining segment is mounted.

An advantage of the design of the vehicle silencer according to the invention is that the inner resonator element can be mounted easily in both housing parts. In particular, an inner resonator element made of a plastic material can be mounted in a housing made of metal, whereby it is possible to prevent the plastic material of the inner resonator element becoming mechanically overstressed due to the different heat expansions of the two materials and after an operating cycle the secure mounting of the inner resonator element would no longer be ensured.

Furthermore, it is possible for the retaining segment to be designed as a pipe section which is arranged coaxially to the first inner pipe section of the inner resonator element. It is an advantage here that the retaining segment is thus arranged to be concentric to the inner pipe section and in this way the flow can be guided in the center of the vehicle silencer.

Alternatively, the retaining segment can be designed as a pipe segment. It is an advantage here that the inner resonator element can have a reduced mass and in addition can be mounted more easily in both housing parts.

Furthermore, it can be preferable to make the first and the second housing part from a metal material, in particular as a sheet metal molded part. It is an advantage here that the two housing parts can be designed to be robust and resistant to temperature. Furthermore, it is also possible to mass produce such metal housing parts in a simple and inexpensive manner. By means of mass production sheet metal molded parts can be produced particularly inexpensively and with a high degree of repeat accuracy, so that the vehicle silencers produced in this way have a high degree of measurement accuracy.

Furthermore, the inner resonator element can be made from a plastic material. It is an advantage here that the inner resonator element, which is designed as a plastic part, has a low density and thus the total mass of the vehicle silencer can be kept as low as possible. Furthermore, an inner resonator element in the form of a plastic part has excellent vibrational properties to be used in a vehicle silencer. A further advantage of a plastic part is that the latter can also be produced by injection molding and thus also complex forms can be produced easily.

Furthermore, it is possible to form an annular chamber between the retaining segment and the first outer casing and/or the second outer casing. It is an advantage here that because of the annular chamber the inner resonator element can expand proportionally more when heated because of its different thermal expansion than the two housing parts, without the inner resonator element contacting the two housing parts.

Furthermore, it is possible that on the inner resonator element opposite the first inner pipe section a second inner pipe section adjoins the chamber dividing wall. It is an advantage here that in this way the first and/or the second resonator chamber can be designed to meet the requirements for sound damping.

Furthermore, an inner diameter of the retaining segment can be smaller than an inner diameter of the retaining groove, whereby in this way in the assembled state the retaining segment is deformed elastically and a force-fitting connection is formed between the retaining segment and retaining groove. In this way it is possible to achieve a sufficiently stable connection between the inner resonator element and the two housing parts.

Furthermore it is preferable to arrange a securing element in the region of the chamber dividing wall on the outside of the inner resonator element, wherein the securing element is mounted between the first housing part and the second housing part. It is an advantage here that a redundancy can be created to mount the inner resonator element in the housing parts in order to prevent the loosening of the inner resonator element in the housing parts.

According to one development the securing element can be designed as peripheral beading. Such beading is easy to produce.

Alternatively, the securing element can be designed in the form of individual positioning pins. In this way it is possible for an outer annular chamber to be flowed through.

Furthermore, it is possible that the retaining segment has a wall thickness of between 0.3 mm and 5 mm, in particular between 0.4 mm and 2 mm, preferably between 1 mm and 1.5 mm. By having a wall thickness in this range it is possible to achieve an advantageous connection between the inner resonator element and housing parts.

Furthermore, it is possible that the retaining segment is designed to project by a distance of between 5 mm and 50 mm, in particular between 7 mm and 20 mm, preferably between 10 mm and 15 mm relative to the first outer pipe section or relative to the second outer pipe section. It is an advantage here that the retaining segment can thus be sufficiently long to absorb a bending torque.

Lastly, the wall thickness of the retaining segment can be slightly larger than the gap width of the retaining groove. It is an advantage here that a transition fit or press fit can be formed between the retaining segment and retaining groove, wherein in this way the fit of the inner resonator element inside the housing parts can be additionally improved.

For a better understanding of the invention the latter is explained in more detail with reference to the following Figures.

In a much simplified, schematic representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
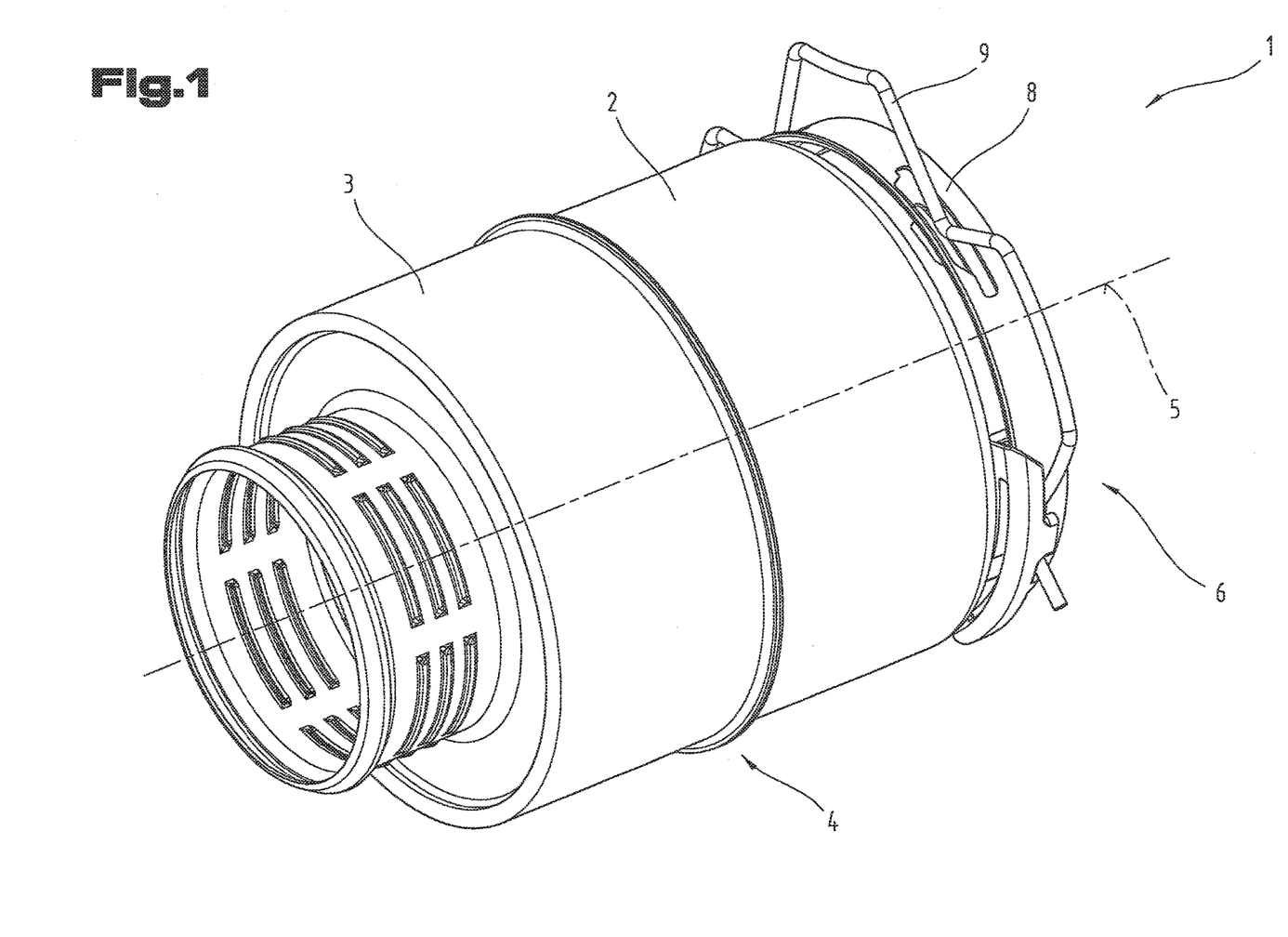
FIG. 1 is a perspective view of a vehicle silencer.

FIG. 1 shows an isometric view of a vehicle silencer 1. The vehicle silencer 1 shown in this view comprises a first housing part 2 and a second housing part 3, which are joined together in a joining or connecting area 4. The vehicle silencer 1 is designed in this embodiment as a rotationally symmetrical hollow body and therefore has a central axis 5. The design according to the invention described in more detail in the following is not restricted to a rotationally symmetrical hollow body, but it is also possible for the vehicle silencer 1 to have an approximately rectangular or a polygonal cross-section. In particular, it is possible that the hollow body has a prismatic base shape, i.e. has in part flat surfaces on its casing surface.

As also shown in FIG. 1, it is possible that a coupling device 6 is connected to the first housing part 2, which is provided to couple the silencer 1 to a turbocharger 7 or to a cable. The coupling device 6 is used in particular, in case of damage to the turbocharger 7 or in case of the need for an engine repair, to remove the silencer 1 as rapidly and easily as possible from the turbocharger 7 and attach the latter back onto the turbocharger 7. The coupling device 6 comprises a coupling body 8, which is designed to be connected to a connecting piece of the turbocharger 7 or to be pushed onto the latter. Furthermore, a fastening element 9 can be provided on the coupling device 6, by means of which fastening element the silencer 1 can be fixed onto the turbocharger 7. Said fastening element 9 can be designed for example, as shown here, as a wire bracket made of spring steel.

Figure 2:
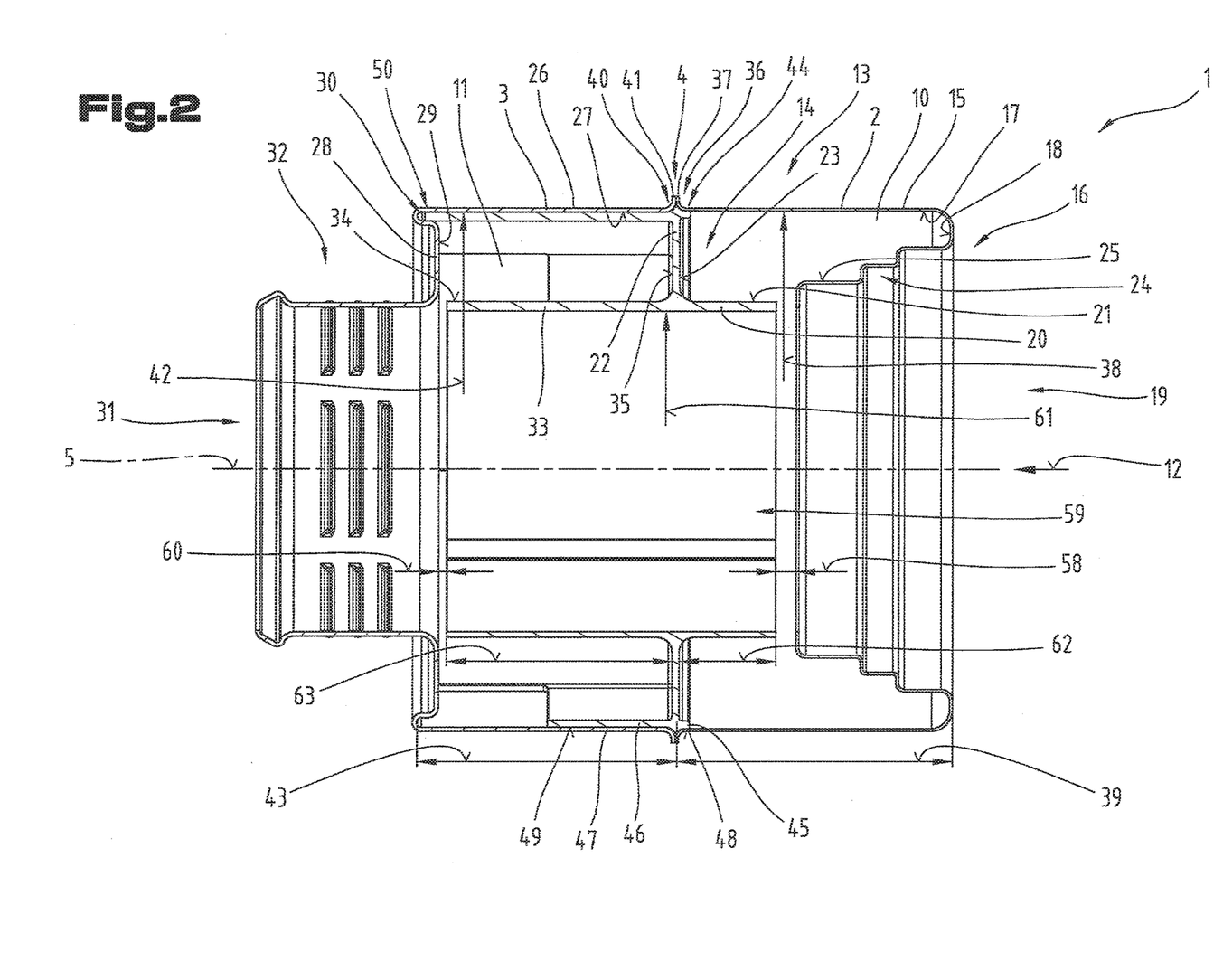
FIG. 2 is a cross-sectional view of the vehicle silencer with a cross-section along its center line.

FIG. 2 shows a cross-section of the vehicle silencer 1 along its central axis 5, wherein the same reference numerals and component names are used for the same parts as in the preceding FIG. 1. To avoid unnecessary repetition reference is made to the detailed description of the preceding FIG. 1.

The vehicle silencer 1 comprises a first resonator chamber 10 and a second resonator chamber 11. In one embodiment variant described in the following it is possible that the vehicle silencer 1 is flowed through in flow direction 12 by gaseous medium, in particular by charging or combustion air. With regard to the flow direction 12 it is possible that the first resonator chamber 10 is arranged in front of the second resonator chamber 11. The two housing parts 2, 3 form an outer casing 13 of the vehicle silencer 1, wherein the two resonator chambers 10, 11 are delimited in said outer casing 13 by an inner resonator element 14.

The first resonator chamber 10 is delimited on the outside by the first housing part 2, wherein the first housing part 2 comprises a first outer casing 15 and a first end wall 16. The first end wall 16 can be designed as a flat wall.

To be precise, the first resonator chamber 10 is delimited in its outer area by an inner casing surface 17 of the first outer casing 15 and by an end face inner surface 18 of the first end wall 16.

The first end wall 16 comprises an inflow opening 19, through which the medium, in particular the compressed suction air, can flow into the first resonator chamber 10. The first resonator chamber 10 is delimited on the inside partially by a first inner pipe section 20 of the inner resonator element 14, or by an outer casing surface 21 of the first inner pipe section 20 and by a chamber dividing wall 22 of the inner resonator element 14 or a first wall surface 23 of the chamber dividing wall 22.

Furthermore, the inflow opening 19 can have an edge 24 which is designed to taper step-like in axial cross-section for mounting the coupling device 6. The step-like tapering edge 24 can be designed to protrude or project into the first resonator chamber 10 so that the latter delimits the first resonator chamber 10. In particular, an outer casing surface 25 of the step-like tapering edge 24 can delimit the first resonator chamber 10.

Similarly, it is possible that the second resonator chamber 11 is delimited in its outer area by the second housing part 3. The second housing part 3 can hereby have a second outer casing 26 with a second inner casing surface 27. Furthermore, it is possible for the second housing part 3 to comprise a second end wall 28, wherein the second resonator chamber 11 is delimited by an second end inner surface 29 of the second end wall 28.

Furthermore, a retaining groove 30 can be formed on the second end wall 28 and/or on the first end wall 16, which retaining groove is used for positioning the inner resonator element 14 in the housing parts 2, 3 of the vehicle silencer 1. The retaining groove 30 or the interaction of the retaining groove 30 with the inner resonator element 14 is described in more detail below in FIG. 5.

The second housing part 3 comprises on the side facing the center of the second end wall 28 an outflow opening 31, through which the gaseous medium can be directed. In said embodiment shown in FIG. 2 the second end wall 28 runs radially from the second outer casing 26 in the direction of the center. The second end wall 28 is therefore arranged at right angles to the second outer casing 26. In further embodiments the second end wall 28 can be designed differently, for example with a slight inclination.

Furthermore, a connecting piece 32 can be coupled to the outflow opening 31, which is provided to connect a pressure hose to the vehicle silencer 1.

The connecting piece 32 can, as shown in FIG. 2, be designed in one piece with the second housing part 3. In an alternative variant it is also possible that the connecting piece 32 is designed as an independent component which is joined for example by a weld to the second housing part 3. Furthermore, it is possible that the connecting piece 32 does not adjoin the second housing part 3 directly but that additional housing parts are formed on the vehicle silencer 1.

On the inside the second resonator chamber 11 is delimited by a second, inner pipe section 33 of the inner resonator element 14, in particular by an outer casing surface 34 of the second inner pipe section 33. Furthermore, the second resonator chamber 11 is delimited by the chamber dividing wall 22, in particular by a second wall surface 35 of the chamber dividing wall 22 from the first resonator chamber 10.

In the embodiment variant of the vehicle silencer 1 according to FIG. 2 the vehicle silencer 1, which comprises two resonator chambers 10, 11, has a first housing part 2, a second housing part 3 and the inner resonator element 14.

The first housing part 2 and the second housing part 3 are in the form of deep-drawn parts in an advantageous embodiment variant. In particular, it is possible that the two housing parts 2, 3 are shaped or deep-drawn from a metal material, such as a steel sheet. Preferably, stainless steel sheet is used here.

The inner resonator element 14 can be made from a plastic material and designed in particular as an injection molded part.

The individual components of the vehicle silencer 1 are designed so that the inner resonator element 14 is mounted in a form-fitting manner in the retaining groove 30 of the first housing part 2 and/or in the retaining groove 30 of the second housing part 3.

The vehicle silencer 1 can have a material-bonded connection in the connecting area 4, in that the first housing part 2 and the second housing part 3 are connected to one another in said joining or connecting area 4 by means of a laser or plasma weld.

In the following part of the description the individual parts of the vehicle silencer 1 are described with respect to their design. However, it should be noted that the design of said individual parts relates to one embodiment variant of the vehicle silencer 1. It is not absolutely necessary in the design according to the invention that all of the design features of the individual parts described here are implemented or are configured as described here.

The first housing part 2 comprises in its connecting area 4 to the second housing part 3 a first connection section 36. The first connection section 36 comprises at its free end a radially outwards projecting flange 37, by means of which the first housing part 2 is connected to the second housing part 3.

The connection between the first housing part 2 and second housing part 3 is preferably formed by a material-bonded connection, such as a weld, in particular a laser, plasma or microplasma weld.

The first outer casing 15 connects to the first connection section 36. The first outer casing 15 has on its inner casing surface 17 a cross-sectional dimension 38. The first outer casing 15 also has an axial extension 39.

Adjoining the first outer casing 15 is the first end wall 16 which comprises the inflow opening 19 and the edge 24 which tapers step-like in axial cross-section for mounting the coupling device 6. The first end wall 16 adjoins the first outer casing 15 running in the direction of the center.

The second housing part 3 has a second connection section 40, with which the second outer casing 26 connects.

In particular, the area around the connection section 40 of the second housing part 3 is designed to be similar to the first connection section 36 of the first housing part 2. To avoid repetition a detailed description of the individual surfaces and layers is not given here.

A flange 41 also adjoins the second connection section 40, which in the installed state is preferably connected by the weld to the flange 37 of the first connection section 36. The second outer casing 26 has a cross-sectional dimension 42 on its inner casing surface 27.

The cross-sectional dimension 42 of the second outer casing 26 can be slightly smaller than the cross-sectional dimension 38 of the first outer casing 15, due to the different material thicknesses of the housing parts 2, 3. The second outer casing 26 also has an axial extension 43.

Furthermore, it is possible that the inner resonator element 14 on an outer periphery 44 of its chamber dividing wall 22 comprises a first outer pipe section 45 and/or a second outer pipe section 46 which connect opposite one another to the chamber dividing wall 22.

As shown clearly in FIG. 2, the first outer pipe section 45 and/or the second outer pipe section 46 of the inner resonator element 14 can be designed and dimensioned such that an annular chamber 47 is formed between the latter and the first outer casing 15 and/or the second outer casing 26. In particular, the annular chamber 47 can extend between the inner casing surface 17 of the first outer casing 15 and an outer casing surface 48 of the first outer pipe section 45.

Furthermore, the annular chamber 47 can extend between the inner casing surface 27 of the first outer casing 15 and an outer casing surface 49 of the second outer pipe section 46.

Furthermore, on the inner resonator element 14 a retaining segment 50 is formed which cooperates with the retaining groove 30 and by means of which the inner resonator element 14 is held in the housing parts 2, 3.

The retaining segment 50 can directly adjoin the first outer pipe section 45 and/or the second outer pipe section 46. Alternatively, it is also possible that the retaining segment 50 directly adjoins the chamber dividing wall 22 and that no first outer pipe section 45 and/or second outer pipe section 46 is formed.

The retaining segment 50 can be formed as a peripheral section and have a pipe-like structure. In an alternative variant it is also possible for the retaining segment 50 to be formed by individual segments distributed evenly on the periphery. A retaining segment 50, which is designed in the form of individual segments, has the advantage that the individual segments are bendable and thus can be displaced radially elastically at their end facing away from the chamber dividing wall 22. In this way clamping can be performed in which the retaining segment 50 is pushed into the retaining groove 30, wherein in the installed state the retaining segment 50 exerts a force acting radially to the center on the retaining groove 30. In this way a force-fitting connection can be formed between the retaining segment 50 and retaining groove 30.

A further advantage of a segmented retaining segment 50 is that the amount of material used can be reduced. In this way the mass of the inner resonator element 14 can be reduced.

Figure 3:
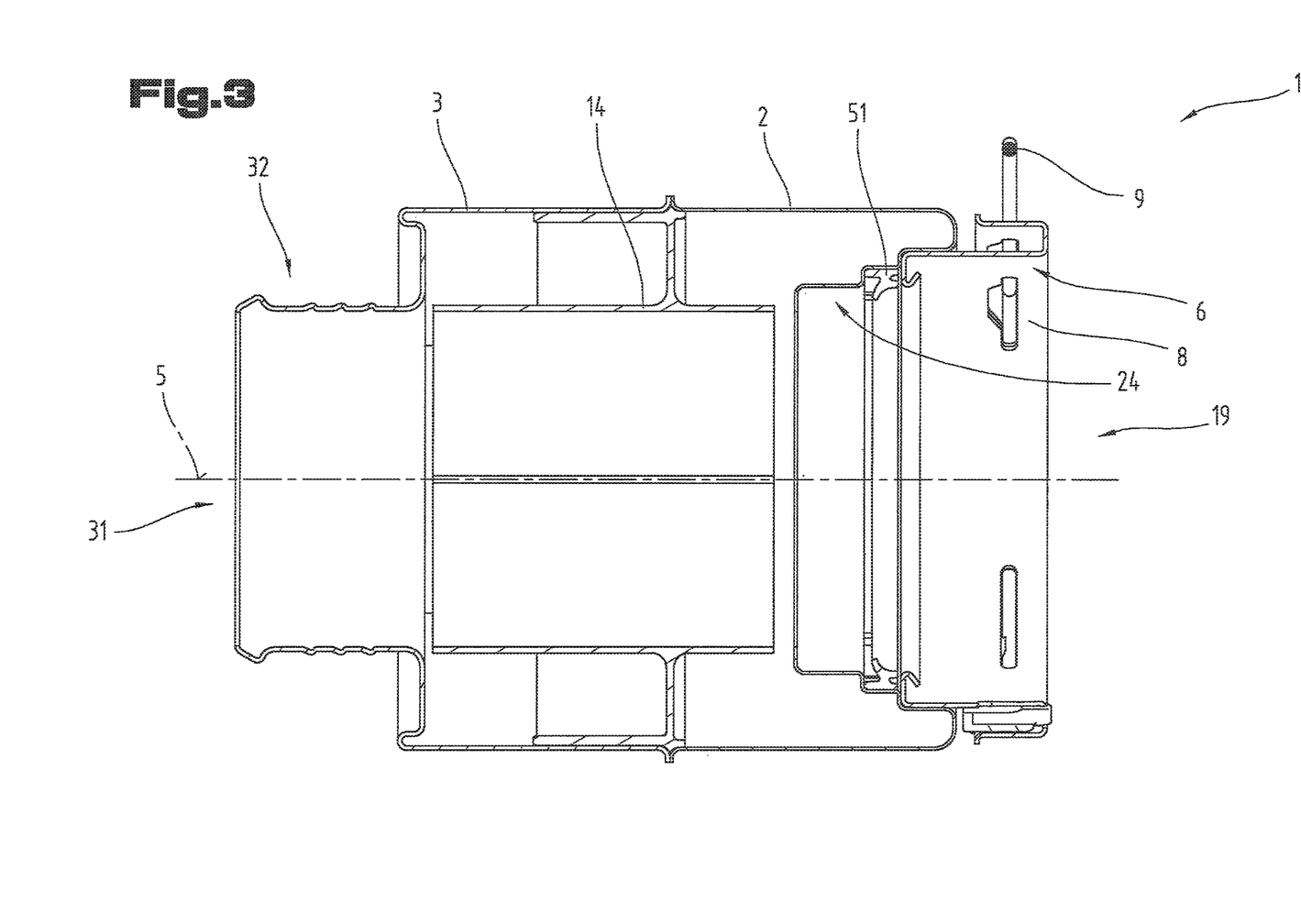
FIG. 3 is a cross-sectional view of the vehicle silencer with a coupling body.

The individual segments of the retaining segment 50 can be designed in different ways. For example, it is possible to arrange over ten of said segments on the periphery, wherein the individual segments only extend over a small angular range. In another embodiment variant it is also possible to have only two segments, wherein both segments can extend over an angle of approximately 180°, so that only a small gap is formed between these two half-shells, FIG. 3 shows a further cross-sectional view of the assembled vehicle silencer 1, wherein the same reference numerals and component names are used for the same parts as in the preceding FIGS. 1 and 2. To avoid unnecessary repetition reference is made to the detailed description of the preceding FIGS. 1 and 2.

The section line of the cross-sectional view in FIG. 3 is rotated 90° relative to the section line of the cross-sectional view of FIG. 2. The retaining segment 50 is thus not cut through directly.

FIG. 3 shows the installation situation of the coupling body 8, wherein the fastening element 9 inserted into the coupling body 8 is also shown. As also shown clearly in FIG. 3 it is possible for a sealing element 51 to be formed which is used for sealing between the vehicle silencer 1 and a cable to be connected with the latter or a turbocharger 7 to be connected to the latter. The sealing element 51 can be mounted on a step-like tapering edge 24, wherein it is possible that the sealing element 51 is secured in position by the coupling body 8.

Figure 4:
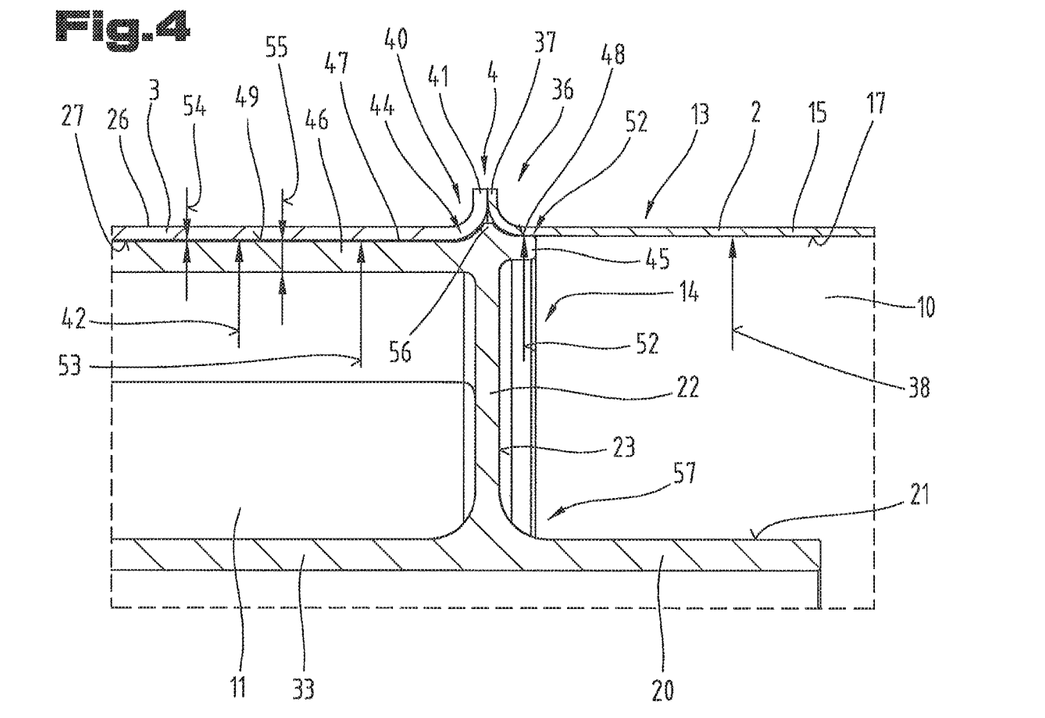
FIG. 4 is a detailed view of the annular chamber from the cross-sectional view according to FIG. 2.

FIG. 4 shows a detailed view of the connecting area 4 of the two housing parts 2, 3.

Figure 5:
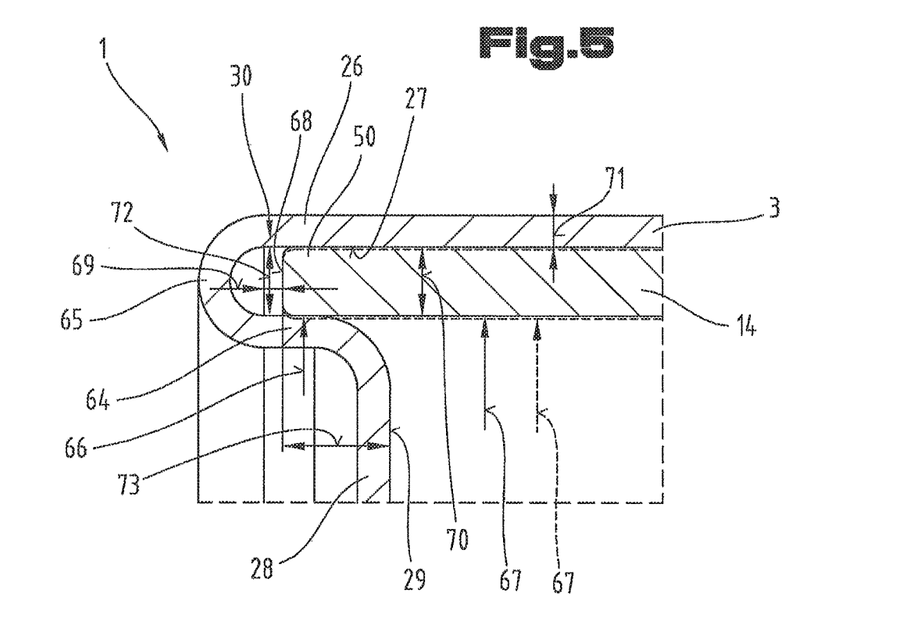
FIG. 5 is a detailed view of the retaining groove from the cross-sectional view according to FIG. 2.

FIG. 5 shows a detailed view of the retaining segment 50.

The following description is based on an overview of FIGS. 2, 4 and 5.

The annular chamber 47 can be designed in particular in that an outer diameter 52 of the first outer pipe section 45 and/or an outer diameter 53 of the second outer pipe section 46 are smaller than the cross-sectional dimension 38 of the inner casing surface 17 of the first outer casing 15 and/or the cross-sectional dimension 42 of the inner casing surface 27 of the second outer casing 26. From the difference between the cross-sectional dimensions a gap width 54 is formed which defines the size of the annular chamber 47.

The annular chamber 47 can also be used for the flow connection of the two resonator chambers 10, 11. Thus with an increase in pressure in the first resonator chamber 10 the pressure wave coming from the latter can be damped in the annular chamber 47. In particular, by means of the annular chamber 47 in the vehicle silencer 1 an additional frequency can be damped, whereby the damping properties of the vehicle silencer 1 can be improved.

The damping behavior of the vehicle silencer 1 can also be influenced by the wall thickness 55 of the outer pipe sections 45, 46.

The inner resonator element 14 can comprise a securing element 56 which is used for securing the inner resonator element 14 inside the two housing parts 2, 3. In particular, it is possible that the inner resonator element 14 is held in position by clamping between the retaining segment 50 and retaining groove 30 and that the securing element 56 is not in engagement with one of the two housing parts 2, 3. If the clamping between the retaining segment 50 and retaining groove 30 should fail the securing element 56 is used to keep the inner resonator element 14 in position at least approximately.

In a first embodiment the securing element 56 can be in the form of peripheral beading. As shown in FIG. 4, it is advantageous if the securing element 56 is adapted in form to the shape of the two housing parts 2, 3.

In a further embodiment it is possible for the securing element 56 to be designed as a securing segment or securing pin and is therefore not peripheral. It is possible for a plurality of said securing pins to be arranged distributed around the periphery. In particular, it is possible for three securing pins to be arranged evenly around the periphery of the inner resonator element 14, i.e. offset 120° relative to one another.

Furthermore, the securing pin or pins can be designed such that in the joined state of the two housing parts 2, 3 it can be mounted between the first connection section 36 and second connection section 40. The inner resonator element 14 can thus be inserted in the vehicle silencer 1 by joining the two housing parts 2, 3 to one another.

The securing pin can be designed in one piece with the inner resonator element 14 for example. However, it is also possible for the securing pin to be applied as a sprue afterwards onto the inner resonator element 14.

The chamber dividing wall 22 is formed adjoining the outer pipe sections 45, 46 of the inner resonator, element 14. The chamber dividing wall 22 extends in the direction of the center of the vehicle silencer 1. The first inner pipe section 20 is formed on a first side on the inner periphery 57 of the chamber dividing wall 22 extending in radial direction. The first inner pipe section 20 is drawn here from the chamber dividing wall 22 in the direction of the inflow opening 19. On the opposite side of the chamber dividing wall 22 the second inner pipe section 33 is formed which runs or is drawn from the chamber dividing wall 22 in direction of the outflow opening 31.

By means of the first inner pipe section 20 and the first housing part 2 a first chamber gap 58 is formed, by means of which the first resonator chamber 10 is connected to a free flow opening 59 so that gas exchange is possible between the latter. Similarly, a second chamber gap 60 is formed by the second inner pipe section 33 and the second housing part 3 by means of which the second resonator chamber 11 is connected to the free flow opening 59.

The first inner pipe section 20 and the second inner pipe section 33 preferably have an identical inner diameter 61. An axial extension 62 of the first inner pipe section 20 and an axial extension 63 of the second inner pipe section 33 are measured as a function of the axial extension 39 of the first outer casing 15 or of the axial extension 43 of the second outer casing 26. By varying the axial extension 62 of the first inner pipe section 20 or the axial extension 63 of the second inner pipe section 33 the chamber gaps 58, 60 can be defined and the resonator behavior can be influenced by the latter.

As shown in FIG. 5 the retaining groove 30 can be formed in that adjoining the second outer casing 26 an abutment section 64 is formed which abutment section 64 runs parallel to the outer casing 26 and is arranged inside the second outer casing 26. The abutment section 64 is turned 180° relative to the second outer casing 26, wherein a bend section 65 is formed which connects the abutment section 64 to the second outer casing 26.

The second end wall 28 is formed adjoining the abutment section 64 at an angle of 90°.

Similar to this design of the retaining groove 30 in the second housing part 3 the retaining groove 30 can also be arranged in the first housing part 2.

As shown particularly clearly in FIG. 5, the retaining groove 30 can have an inner diameter 66 which is formed in particular by the abutment section 64. For illustrative purposes in FIG. 5 the retaining segment 50 is shown by a dashed line in its non-installed and therefore not deformed state. It is shown clearly here that the retaining segment 50 can have an inner diameter 67 which is slightly smaller than the inner diameter 66 of the retaining groove 30.

Only by joining the inner resonator element 14 to the second housing part 3 is the retaining segment 50 is deformed elastically so that the retaining segment 50 pushes on the abutment section 64 of the retaining groove 30 and thus generates friction which fixes the inner resonator element 14 in the second housing part 3 by means of the retaining segment 50.

As also shown in FIG. 5 it is possible that one end wall 68 of the retaining segment 50 is spaced part by a distance 69 from the bend section 65. In this way it is possible for the retaining segment 50 not to be clamped axially by form-fitting in the second housing part 3, but for the clamping of the inner resonator element 14 in the second housing part 3 to only be performed by force or friction. The distance 69 can be between 0.1 mm and 5 mm, in particular between 0.15 mm and 2 mm, preferably between 0.2 mm and 1 mm.

In order to achieve a good functionality of the vehicle silencer 1 the retaining segment 50 can have a wall thickness 70 of between 0.5 mm and 10 mm, in particular between 0.9 mm and 5 mm, preferably between 1 mm and 2 mm.

Furthermore, it is possible that a wall thickness 71 of the second housing part 3 is between 0.3 mm and 5 mm, in particular between 0.4 mm and 2 mm, preferably between 0.5 mm and 0.7 mm.

Furthermore, it is possible for the gap width 72 of the retaining groove 30 to be between 0.5 mm and 10 mm, in particular between 0.9 mm and 5 mm, preferably between 1 mm and 2 mm. In a first embodiment variant it is possible for the wall thickness 70 of the retaining segment 50 to be slightly smaller than the gap width 72 of the retaining groove 30. In this way the inner resonator element 14 is held in one of the housing parts only by the elasticity of the retaining segment 50 and the thereby applied pressing effect.

In an alternative variant it is possible for the wall thickness 70 of the retaining segment 50 to be the same size as or slightly greater than the gap width 72 of the retaining groove 30. In this way additional clamping can be provided between the retaining segment 50 and retaining groove 30.

Furthermore, it is possible that an overhang 73 of the retaining segment 50 relative to the second end inner surface 29 of the second end wall 28 is between 0.5 mm and 10 mm, in particular between 1 mm and 5 mm, preferably between 1.5 mm and 2.5 mm.

Figure 6:
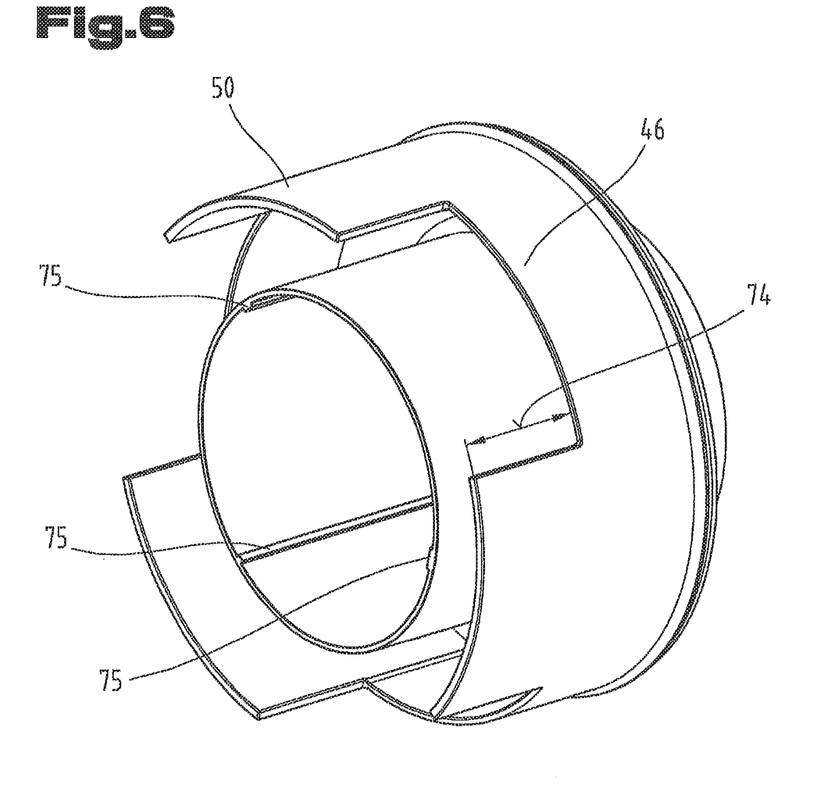
FIG. 6 is a perspective view of the inner resonator element.

FIG. 6 shows a perspective view of the inner resonator element 14, wherein the same reference numerals or component names are used for the same parts as in the preceding FIGS. 1 to 5. To avoid unnecessary repetition reference is made to the detailed description of the preceding FIGS. 1 to 5.

In a preferred embodiment variant, as shown in FIG. 6, it is possible for three segments to be formed in the region of the retaining segment 50 which are arranged distributed evenly around the periphery. The individual segments can extend over an angle of between 10° and 115°, in particular between 30° and 90°, preferably between 55° and 65°. The free spaces formed between the individual segments vary depending on the extension of the individual segments.

In particular, the retaining segment 50 can be designed to protrude relative to the second outer pipe section 46 by a distance 74. The distance 74 can be between 5 mm and 50 mm, in particular between 7 mm and 20 mm, preferably between 10 mm and 15 mm.

As also shown in FIG. 6, on the inner pipe sections 20, 33 one or more ribs 75 can be arranged which can be designed differently in terms of their angle to one another and/or in their width, to enable the correct positioning of the inner resonator element 14 in the housing parts 2, 3.

Figure 7:
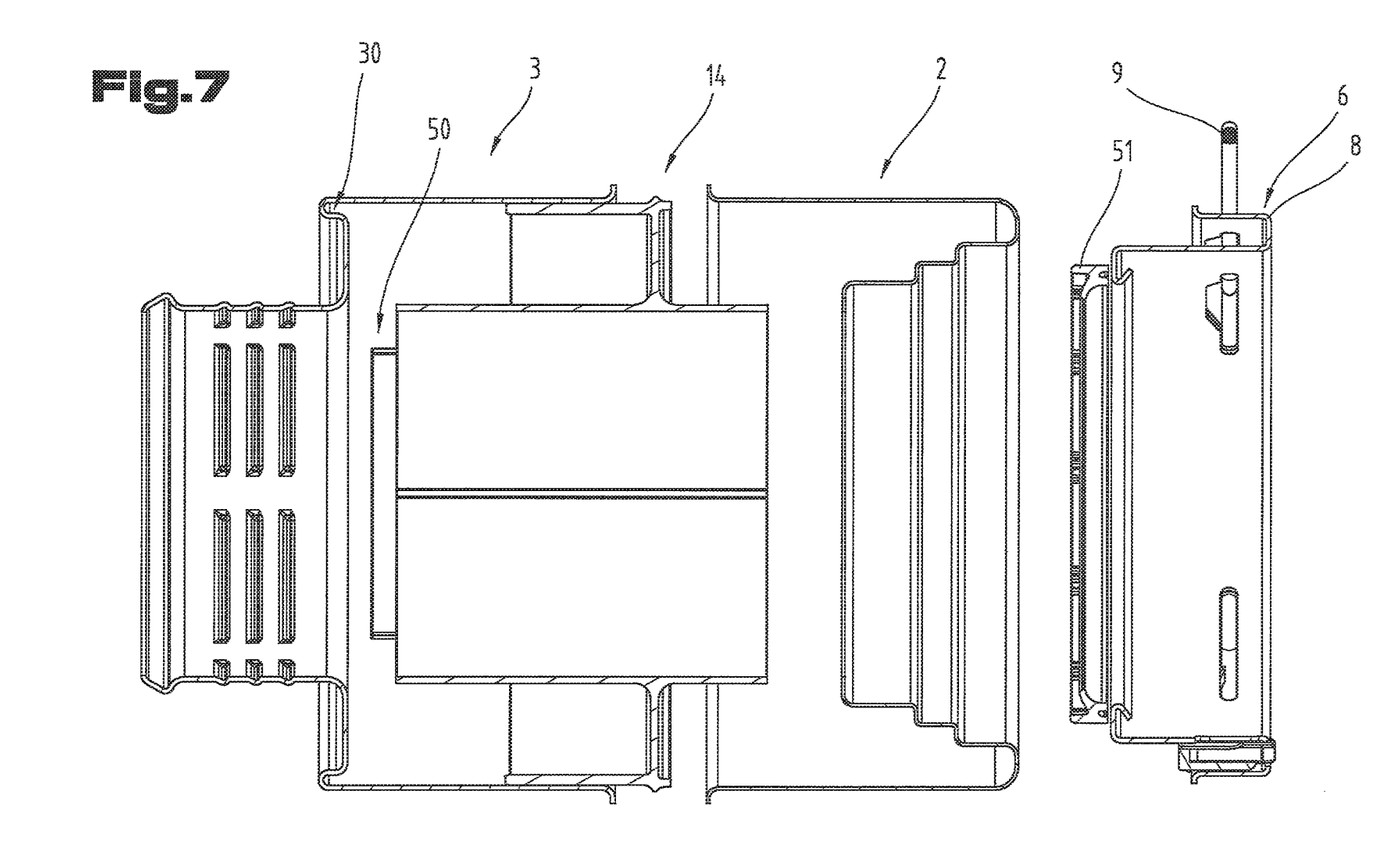
FIG. 7 is an exploded view of the vehicle silencer in cross-sectional view.

FIG. 7 shows an exploded view of the vehicle silencer 1, wherein the same reference numerals and component names are used for the same part as in the preceding FIGS. 1 to 6. To avoid unnecessary repetition reference is made to the detailed description in the preceding FIGS. 1 to 6. It is clear from FIG. 7 how the vehicle silencer 1 can be made and assembled.

At the beginning of the production process at least the first housing part 2 and the coupling body 8 are deep drawn to obtain their characteristic form.

In a further method step the first housing part 2 is held by a device or a manipulation robot. Afterwards the sealing element 51 are inserted axially into the first housing part 2, in particular onto the step-like tapering edge 24.

If the sealing element 51 is now placed relative to the first housing part 2, in a further method step the coupling body 8 can be inserted onto the step-like tapering edge 24. The coupling body 8 is hereby aligned so that the end wall of the coupling body 8 points towards the first housing part 2.

In a further method step the coupling body 8 and the first housing part 2 are joined together by a weld, in particular a laser or plasma weld. A laser or plasma weld have the advantage, that the input of heat is only very low and is limited locally. In this way the sealing element 27 is not damaged during the welding process.

In a further method step the inner resonator element 14 can be inserted into the second housing part 3, which can also be deep-drawn, wherein the retaining segment 50 is pushed into the retaining groove 30.

In a further method step the first housing part 2 can be joined to the second housing part 3 by means of a weld.

Figure 8:
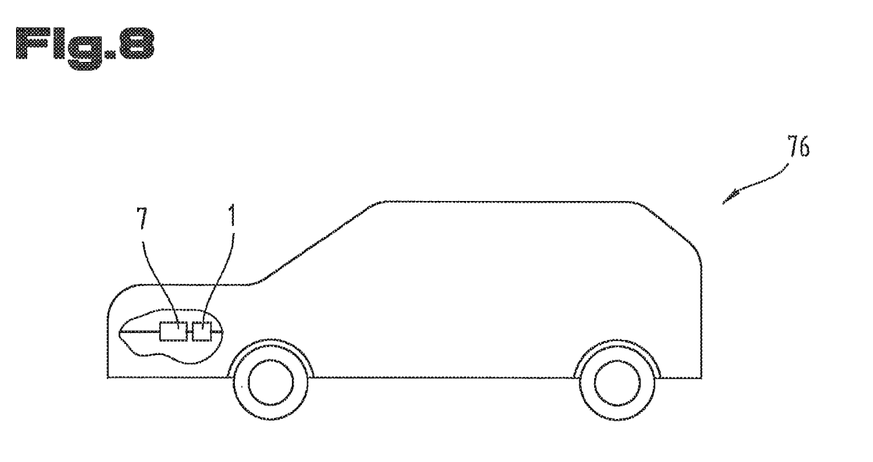
FIG. 8 is a schematic representation of a motor vehicle with a vehicle silencer connected to the turbocharger.

FIG. 8 shows a vehicle 76 with the turbocharger 7 and a vehicle silencer 1 according to the invention connected to the pressure side of the turbocharger 7.

A turbocharger 7 is defined as a compression device for the combustion air of the combustion engine of the vehicle 76. Instead of a turbocharger 7 also a compressor arrangement or other device increasing the charging pressure of the combustion air can be used. The vehicle silencer 1 according to the invention reduces or minimizes flow sounds, whistling or vibrational noises which occur during the operation of the combustion engine at least within a certain frequency range. By means of the given vehicle silencer 1 thus the achievable comfort level of motor vehicles can be increased, which have a combustion engine provided with the given vehicle silencer 1 on the charging pressure side.

The embodiments show possible embodiment variants of the vehicle silencer 1, wherein it should be noted at this point that the invention is not restricted to the particular embodiment variants shown in particular, but rather various different combinations of the individual embodiment variants are possible and this variability due to the teaching on technical procedure if the present invention can be achieved by specialists in this technical field.

Furthermore, individual features or combinations of features of the shown and described different embodiments can represent independent solutions according to the invention.

The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly, the individual designs shown in FIGS. 1 to 8 can form the subject matter of independent solutions according to the invention. The relevant objectives and solutions according to the invention can be taken from the detailed descriptions of said Figures.

Lastly, as a point of formality it should be noted that for a better understanding of the structure of the vehicle silencer 1 the latter or its components have not been shown to scale.

| List of reference numerals | |
|---|---|
| 1 | vehicle silencer |
| 2 | first housing part |
| 3 | second housing part |
| 4 | connecting area |
| 5 | central axis |
| 6 | coupling device |
| 7 | turbocharger |
| 8 | coupling body |
| 9 | fastening element |
| 10 | first resonator chamber |
| 11 | second resonator chamber |
| 12 | flow direction |
| 13 | outer casing |
| 14 | inner resonator element |
| 15 | first outer casing |
| 16 | first end wall |
| 17 | first inner casing surface |
| 18 | end inner surface |
| 19 | inflow opening |
| 20 | first inner pipe section |
| 21 | outer casing surface |
| 22 | chamber dividing wall |
| 23 | first wall surface |
| 24 | edge |
| 25 | outer casing surface |
| 26 | second outer casing |
| 27 | second inner casing surface |
| 28 | second end wall |
| 29 | second end inner surface |
| 30 | retaining groove |
| 31 | outflow opening |
| 32 | connecting piece |
| 33 | second inner pipe section |
| 34 | outer casing surface |
| 35 | second wall surface |
| 36 | first connection section |
| 37 | flange of first connection section |
| 38 | cross-sectional dimension of first outer casing |
| 39 | axial extension of first outer casing |
| 40 | second connection section |
| 41 | flange of second connection section |
| 42 | cross-sectional dimension of second outer casing |
| 43 | axial extension of second outer casing |
| 44 | outer periphery of inner resonator element |
| 45 | first outer pipe section |
| 46 | second outer pipe section |
| 47 | annular chamber |
| 48 | outer casing surface of first outer pipe section |
| 49 | outer casing surface of second outer pipe section |
| 50 | retaining segment |
| 51 | sealing element |
| 52 | outer diameter of first pipe section |
| 53 | outer diameter of second pipe section |
| 54 | gap width |
| 55 | wall thickness of outer pipe section |
| 56 | securing element |
| 57 | inner periphery |
| 58 | first chamber gap |
| 59 | free flow opening |
| 60 | second chamber gap |
| 61 | inner diameter pipe sections |
| 62 | axial extension of first inner pipe section |
| 63 | axial extension of second inner pipe section |
| 64 | abutment section |
| 65 | bend section |
| 66 | inner diameter of retaining groove |
| 67 | inner diameter of retaining segment |
| 68 | end wall retaining segment |
| 69 | distance |
| 70 | wall thickness of retaining segment |
| 71 | wall thickness of first housing part |
| 72 | gap width of retaining groove |
| 73 | overhang of retaining segment |
| 74 | distance of retaining segment |
| 75 | rib |
| 76 | vehicle |

The invention claimed is:

1. A vehicle silencer for a charge air line of an internal combustion engine with a turbocharger, comprising: at least one first housing part with a first outer casing, which comprises a first end wall, and a second housing part with a second outer casing, which comprises a second end wall, wherein the housing parts are coupled together in a connecting area and form an outer casing of the vehicle silencer;
an inner resonator element, which is mounted in at least one of the housing parts and at least one chamber dividing wall, and adjoining an inner periphery (57) of the chamber dividing wall comprises at least one first inner pipe section, wherein by means of the two housing parts and the inner resonator element at least one first and one second resonator chamber are formed,
wherein the inner resonator element comprises in the region of an outer periphery of the inner resonator element at least one first outer retaining segment, and in the first end wall and/or in the second end wall a retaining groove is formed in which the retaining segment is mounted, and
wherein a securing element is arranged in the region of the chamber dividing wall on the outside of the inner resonator element, wherein the securing element is mounted between the first housing part and the second housing part.

2. The vehicle silencer as claimed in claim 1, wherein the retaining segment is designed as a pipe section which is arranged to be coaxial to the first inner pipe section of the inner resonator element.

3. The vehicle silencer as claimed in claim 1, wherein the retaining segment is designed as a pipe segment.

4. The vehicle silencer as claimed in claim 1, wherein the first housing part and the second housing part are made from a metal material.

5. The vehicle silencer as claimed in claim 1, wherein the inner resonator element is made from a plastic material.

6. The vehicle silencer as claimed in claim 1, wherein an annular chamber is formed between the retaining segment and the first outer casing and/or the second outer casing.

7. The vehicle silencer as claimed in claim 1, wherein on the inner resonator element opposite the first inner pipe section a second inner pipe section is connected to the chamber dividing wall.

8. The vehicle silencer as claimed in claim 1, wherein an inner diameter of the retaining segment is smaller than an inner diameter of the retaining groove, wherein in the assembled state the retaining segment is deformed elastically and a force-fitting connection is formed between the retaining segment and retaining groove.

9. The vehicle silencer as claimed in claim 1, wherein the securing element is designed as a peripheral beading.

10. The vehicle silencer as claimed in claim 1, wherein the securing element is designed in the form of individual positioning pins.

11. The vehicle silencer as claimed in claim 1, wherein the retaining segment has a wall thickness between 0.3 mm and 5 mm.

12. The vehicle silencer as claimed in claim 1, wherein the retaining segment is designed to project by a distance between 5 mm and 50 mm.

13. The vehicle silencer as claimed in claim 1, wherein the wall thickness of the retaining segment is slightly larger than the gap width of the retaining groove.

\* \* \* \* \*